United States Patent
Gagnon et al.

(10) Patent No.: US 6,553,248 B1
(45) Date of Patent: Apr. 22, 2003

(54) COMPUTING BY ANTICIPATION FOR NUCLEAR MEDICINE IMAGING

(75) Inventors: Daniel Gagnon, Twinsburg, OH (US); Jerome W. Brack, Solon, OH (US)

(73) Assignee: Koninklijke Philips Electronics, N.V., Eindhoven (NL)

( * ) Notice: Subject to any disclaimer, the term of this patent is extended or adjusted under 35 U.S.C. 154(b) by 0 days.

(21) Appl. No.: 09/437,783

(22) Filed: Nov. 9, 1999

(51) Int. Cl.⁷ .............................................. A61B 5/05
(52) U.S. Cl. ...................................................... 600/407
(58) Field of Search ................................ 128/922, 925; 600/410, 407; 324/307, 309; 382/128, 133, 224, 131; 705/3

(56) References Cited

U.S. PATENT DOCUMENTS

| | | | |
|---|---|---|---|
| 5,235,510 A | * | 8/1993 | Yamada et al. ........ 364/413.02 |
| 5,878,746 A | * | 3/1999 | Lemelson et al. ....... 128/653.1 |
| 6,097,977 A | * | 8/2000 | Collick et al. ............... 600/410 |
| 6,198,839 B1 | * | 3/2001 | Kuan et al. .................. 382/133 |
| 6,266,453 B1 | * | 7/2001 | Hibbard et al. ............. 382/131 |
| 6,269,177 B1 | * | 7/2001 | Dewaele et al. ............ 382/131 |
| 6,351,573 B1 | * | 2/2002 | Schneider ................... 382/128 |
| 6,411,836 B1 | * | 6/2002 | Patel et al. .................. 600/407 |

* cited by examiner

Primary Examiner—Marvin M. Lateef
Assistant Examiner—Eleni Mantis Mercader
(74) Attorney, Agent, or Firm—Fay, Sharpe, Fagan, Minnich & McKee, LLP

(57) ABSTRACT

A method for reconstructing an image representation of a subject from data sets collected using a medical diagnostic imaging apparatus is provided. The method includes defining operations which are performed in reconstructing desired types of image representations. The operations are applicable to data sets having particular formats. Data sets having particular formats are identified, and operations are selected from the defined operations based upon the particular format of the identified data sets. When a detected load on available image processing equipment is below a desired level, then selected operations are automatically performed on the identified data sets.

16 Claims, 4 Drawing Sheets

COMPUTING BY ANTICIPATION FOR NUCLEAR MEDICINE IMAGING

BACKGROUND OF THE INVENTION

The present invention relates to the art of medical diagnostic imaging. It finds particular application in conjunction with imaging apparatus such as nuclear or gamma cameras of the type use in single photon emission computed tomography (SPECT), whole body nuclear scans, positron emission tomography (PET), etc., and will be described with reference thereto. However, it is to be appreciated that the present invention is also amenable to other like applications and other imaging modes.

Diagnostic nuclear imaging is used to study a radionuclide distribution in a subject. Typically, in SPECT for example, one or more radiopharmaceuticals or radioisotopes are injected into a subject. The radiopharmaceuticals are commonly injected into the subject's blood stream for imaging the circulatory system or for imaging specific organs which absorb the injected radiopharmaceuticals. One or more gamma or scintillation camera detector heads, typically including a collimator, are placed adjacent to a surface of the subject to monitor and record emitted radiation. The camera heads typically include a scintillation crystal which produces a flash or scintillation of light each time it is struck by radiation emanating from the radioactive dye in the subject. An array of photomultiplier tubes and associated circuitry produce an output signal which is indicative of the (x, y) position of each scintillation on the crystal. Often, the heads are rotated or indexed around the subject to monitor the emitted radiation from a plurality of directions to obtain a plurality of different views. The monitored radiation data from the plurality of views is reconstructed into a three dimensional (3D) image representation of the radiopharmaceutical distribution within the subject.

Generally, a complete diagnostic nuclear imaging study includes the coordination of several steps in order to achieve clinically significant and useful results. Those steps can be broken down as follows: preparing the subject including injecting the subject with the radioactive dye, positioning the subject properly in relation to the imaging apparatus, acquiring the data, processing and presenting the images, clinical interpretation, and optionally archiving of the images.

The image processing can be computationally complex and relatively time intensive and so it is typically carried out by a computer system. In previously developed diagnostic imaging techniques, in addition to overseeing the other steps of the imaging study, image processing or reconstruction is explicitly directed and attended to by a technician or other trained user. That is to say, the technician identifies the data to be processed and the processing operation or operations to be applied thereto to achieve a particular result, and manually links them together to begin processing by the computer system. Consequently, in addition to the time spend on the other steps of the study, more of a technician's valuable time is taken up for conducting or directing the image processing.

Moreover, typically once the image processing is started the systems resources are unavailable to perform other tasks, perhaps higher priority tasks (e.g., another imaging study), until the specifically requested image processing is complete. One solution to this problem (i.e., in order to have system resource available under these circumstances) is to design the computer system for some peak load which is higher than the average load and that could accommodate the parallel tasking. However, such an approach is inefficient insomuch as over time the computer system may be idle for extended periods of time and the additional resources would not therefor be fully utilized.

The present invention contemplates a new and improved technique for diagnostic nuclear imaging which overcomes the above-referenced problems and others.

SUMMARY OF THE INVENTION

In accordance with one aspect of the present invention, a method for reconstructing an image representation of a subject from data sets collected using a medical diagnostic imaging apparatus is provided. The method includes defining operations which are performed in reconstructing desired types of image representations. The operations are applicable to data sets having particular formats. Data sets having particular formats are identified, and operations and selected from the defined operations based upon the particular format of the identified data sets. After detecting a load on available image processing equipment, the selected operations are automatically performed on the identified data sets when the detected load is below a desired level.

In accordance with another aspect of the present invention, a medical diagnostic imaging system includes at least one imaging station. The imaging station includes an imaging scanner which collects image data from a subject positioned therein, and a control terminal from which the imaging scanner is operated. The control terminal includes a computer having a particular amount of resources for operation of the imaging scanner and image processing. The computer automatically carries out image processing when sufficient resources are available and a data set is detected for which an image processing operation is applicable.

One advantage of the present invention is that the computer systems use for image processing and running imaging experiments is defined in terms of an average load rather than a peak load.

Another advantage of the present invention is that for image processing it utilizes otherwise idle computer downtime when imaging experiments are not being conducted.

Yet another advantage of the present invention is that high efficiency and productivity result from automatically performing image processing when system resources are available.

Still further advantages and benefits of the present invention will become apparent to those of ordinary skill in the art upon reading and understanding the following detailed description of the preferred embodiments.

BRIEF DESCRIPTION OF THE DRAWINGS

The invention may take form in various components and arrangements of components, and in various steps and arrangements of steps. The drawings are only for purposes of illustrating preferred embodiments and are not to be construed as limiting the invention.

DETAILED DESCRIPTION OF THE PREFERRED EMBODIMENTS

Figure 1:
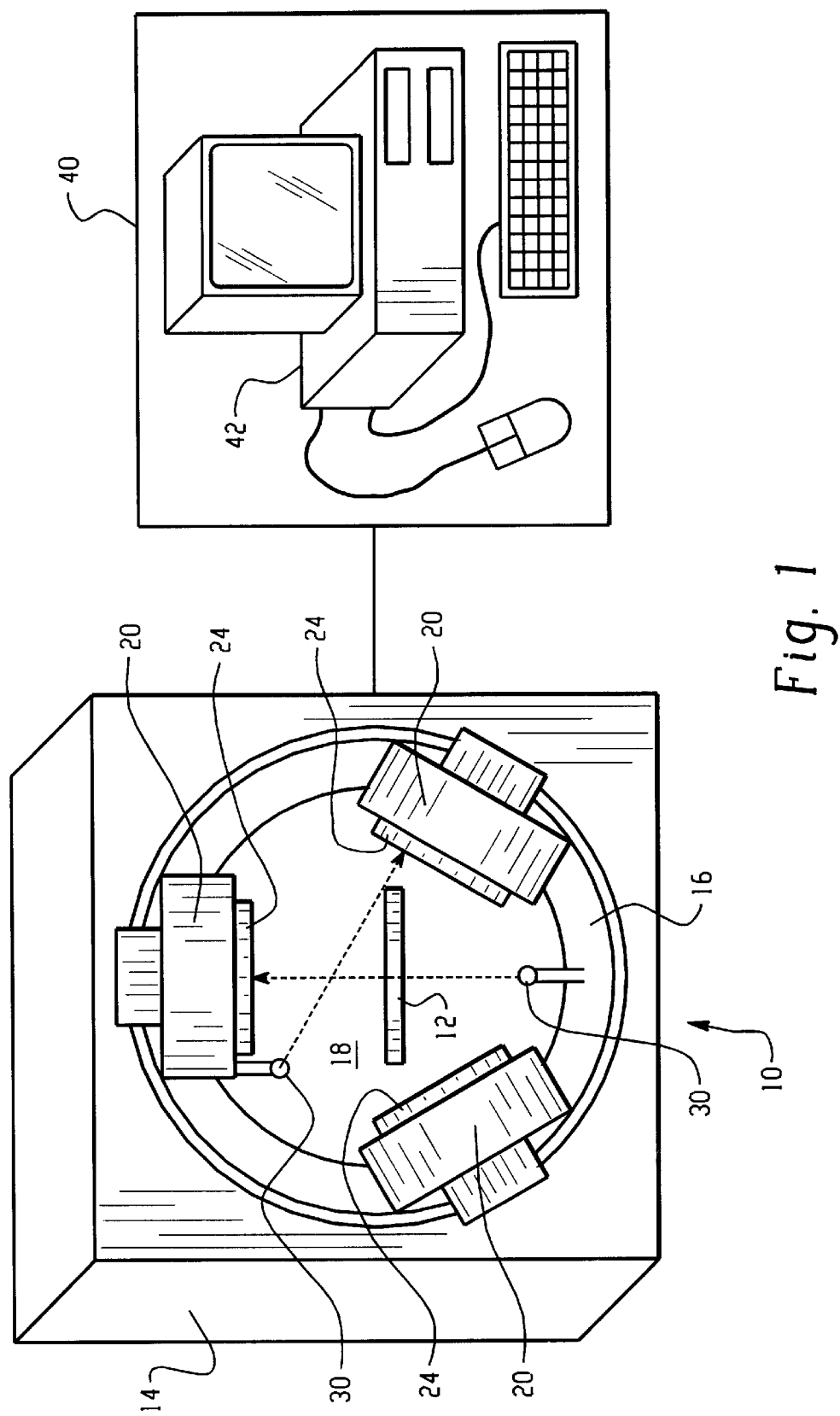
FIG. 1 is a diagrammatic illustration of a medical diagnostic imaging apparatus and control terminal in accordance with aspects of the present invention.

With reference to FIG. 1, a medical diagnostic imaging apparatus 10 is preferably any nuclear medicine scanner that produces scintigraphic images, for example, SPECT scanners or PET scanners. More generally, an appropriate device is one that detects and records the spatial, temporal, and/or other characteristics of emitted photons. Optionally, the medical diagnostic imaging apparatus 10 operates via a different imaging mode, e.g., magnetic resonance imaging (MRI), computed tomography (CT), etc.

For illustrative purposes herein, as shown in FIG. 1, the diagnostic nuclear imaging apparatus or scanner 10 is a gamma camera or SPECT scanner including a subject support 12, such as a table or couch, which supports a subject being examined and/or imaged, such as a phantom a patient, or the like. Alternately, a PET scanner or other such imaging apparatus for the generation and/or collection of projection data is employed. In any event, with reference to a SPECT scanner, the subject is injected with one or more radiopharmaceuticals or radioisotopes such that emission radiation is emitted therefrom. Optionally, the subject support 12 is selectively height adjustable so as to center the subject at a desired height. A first gantry 14 holds a rotating gantry 16 rotatably mounted thereto. The rotating gantry 16 defines a subject-receiving aperture 18. In a preferred embodiment, the first gantry 14 is advanced toward and/or retracted from the subject support 12 so as to selectively position regions of interest of the subject within the subject-receiving aperture 18. Alternately, the subject support 12 is advanced and/or retracted to achieve the desired positioning of the subject within the subject-receiving aperture 18.

One or more detector heads 20 are adjustably mounted to the rotating gantry 16 with varying degrees of freedom of movement. Optionally, the detector heads 20 are circumferentially adjustable to vary their spacing on the rotating gantry 16. Separate translation devices 22, such as motors and drive assemblies (not shown), independently translate the detector heads 20 laterally in directions tangential to the subject-receiving aperture 18 along linear tracks or other appropriate guides. Additionally, the detector heads 20 are also independently movable in radial directions with respect to the subject-receiving aperture 18. Optionally, the detector heads 20 selectively cant or tilt with respect to radial lines from the center of the subject-receiving aperture 18. Alternately, a single motor and drive assembly controls movement of all the detector heads 20 individually and/or as a unit.

Being mounted to the rotating gantry 16, the detector heads 20 rotate about the subject-receiving aperture 18 (and the subject when located therein) along with the rotation of the rotating gantry 16. In operation, the detector heads 20 are rotated or indexed around the subject to monitor radiation from a plurality of directions to obtain a plurality of different angular views.

Each of the detector heads 20 has a radiation-receiving face facing the subject-receiving aperture 18 that includes a scintillation crystal, such as a large doped sodium iodide crystal, that emits a flash of light or photons in response to incident radiation. An array of photomultiplier tubes receive the light and convert it into electrical signals. A resolver circuit resolves x, y-coordinates of each flash of light and the energy of the incident radiation. That is to say, radiation strikes the scintillation crystal causing the scintillation crystal to scintillate, i.e., emit light photons in response to the radiation. The photons are directed toward the photomultiplier tubes. Relative outputs of the photomultiplier tubes are processed and corrected to generate an output signal indicative of (1) a position coordinate on the detector head at which each radiation event is received, and (2) an energy of each event. The energy is used to differentiate between various types of radiation such as multiple emission radiation sources, stray and secondary emission radiation, transmission radiation, and to eliminate noise. An image representation is defined by the radiation data received at each coordinate. The radiation data is then ultimately reconstructed into an image representation of the region of interest.

Optionally, the detector heads 20 include mechanical collimators 24 removably mounted on the radiation receiving faces of the detector heads 20. The collimators 24 preferably include an array or grid of lead or otherwise radiation-absorbent vanes which restrict the detector heads 20 from receiving radiation not traveling along selected rays in accordance with the data type being collected (i.e., parallel beam, fan beam, and/or cone beam).

One or more radiation sources 30 are mounted across the subject-receiving aperture 18 from the detector heads 20. Optionally, they are mounted between the detector heads 20 or to the radiation receiving faces of opposing detector heads 20 such that transmission radiation from the radiation sources 30 is directed toward and received by corresponding detector heads 20 on an opposite side of the subject-receiving aperture 18. In a preferred embodiment, the collimators 24 employed on the detector heads 20, in effect, collimate the transmission radiation. That is to say, the collimators 24 restrict the detector heads 20 from receiving those portions of transmission radiation not traveling directly (for parallel beam configurations) toward the radiation receiving faces of the detector heads 20. Alternately, other collimation geometries are employed and/or the collimation may take place at the source.

In a preferred embodiment, the radiation sources 30 are line sources each extending the axial length of the respective detector heads 20 to which they correspond. Preferably, the lines sources are thin steel tubes filled with radionuclides and sealed at their ends. Alternately, the radiation sources 30 are bar sources, point sources, flat rectangular sources, disk sources, flood sources, a tube or vessel filled with radionuclides, or active radiation generators such as x-ray tubes. Alternately, one or more point sources of transmission radiation may be utilized.

The medical diagnostic imaging apparatus 10 is operated via a control terminal 40. Preferably, the control terminal 40 includes a computer 42 having a central processing unit (CPU), memory (e.g., random access memory (RAM)), a data storage device (e.g., a magnetic disk drive), video monitor, and one or more input devices (e.g., a keyboard, mouse, etc.). The computer 42 is used directly by a technician and/or appropriately programed to run imaging experiments on the medical diagnostic imaging apparatus 10. Additionally, during an imaging experiment the control terminal 40 is used to collect image data from the medical diagnostic imaging apparatus 10 and store it in data sets for processing by the computer 42.

More specifically, the computer 42 reconstructs a desired image representation of the subject by performing various operations on the data sets, such as, e.g., sorting, rebinning, filtering, scaling, interpolating, convolving, backprojecting, transforming, weighting, and other like operations. Generally, a series of operations are performed in succession to process the initial raw data collected from the medical diagnostic imaging apparatus 10 into the desired image representation.

At the time of initial collection and after each operation, the data sets take on a characteristic format, and for any given imaging experiment performed, there are generally a number of different types of image representations that are optionally reconstructed therefrom. Each of the different reconstructed images makes available different medically valuable diagnostic information. Consequently, the selection of which operations to perform depends on the format of the data sets and the type of image representation desired.

Figure 2:
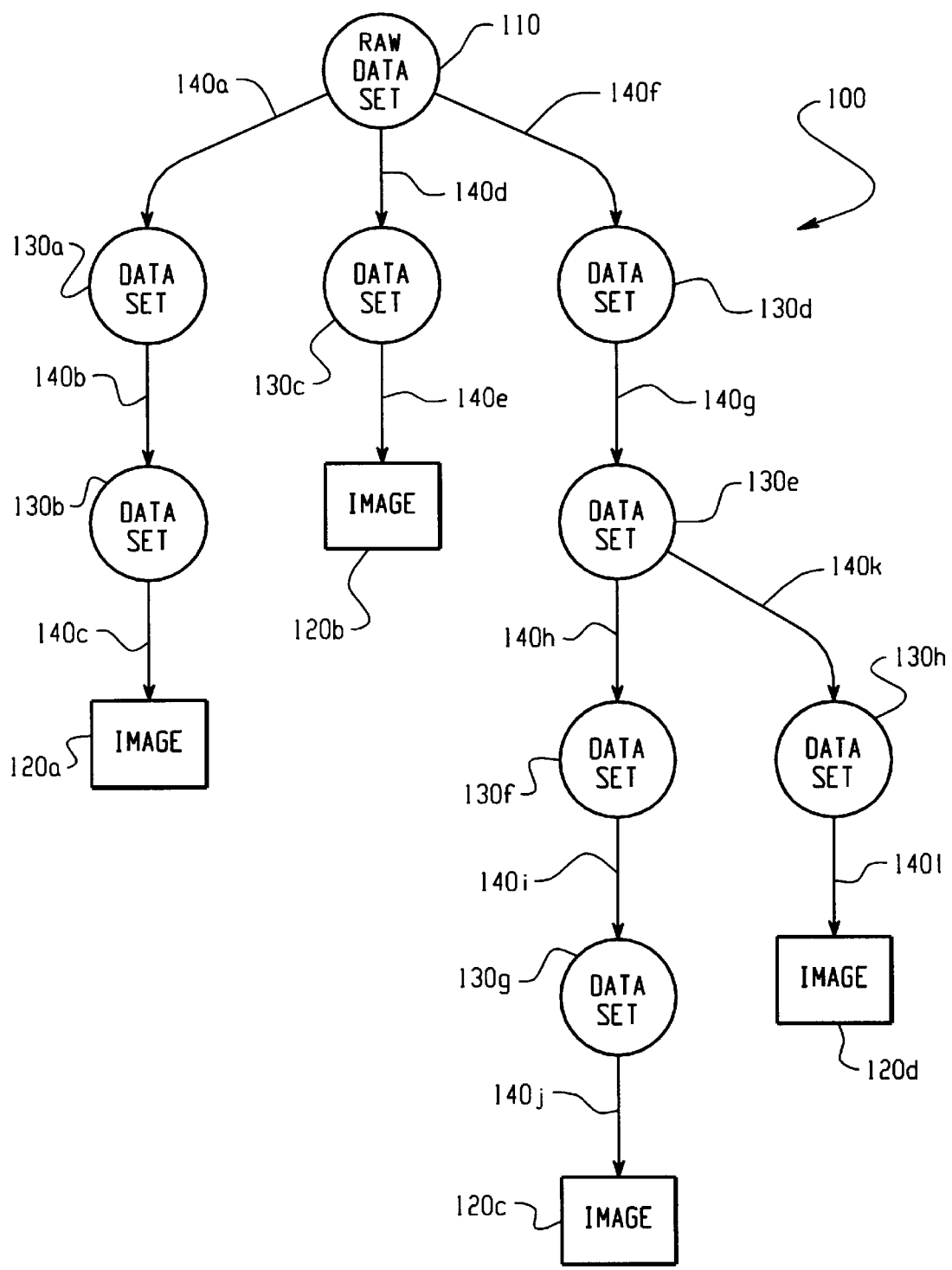
FIG. 2 is a diagrammatic illustration of an exemplary image processing tree in accordance with aspects of the present invention.

With further reference to FIG. 2, a data processing tree 100 illustrates the manner in which different image representations are reconstructed from a data set depending on the processing branch or path taken. In this example, an initially collected data set in its characteristic format, represented by reference numeral 110, is optionally reconstructed into four different image representations, represented by reference numerals 120a–d, by performing different series of operations on the data set. Along the way, the data set takes on a new characteristic format, represented by reference numerals 130a–h, after each operation, represented by the connecting line segments 140a–1. Therefore, the series of operations selected or processing branch or path chosen determines which of the image representations 120a–d is reconstructed.

Figure 3:
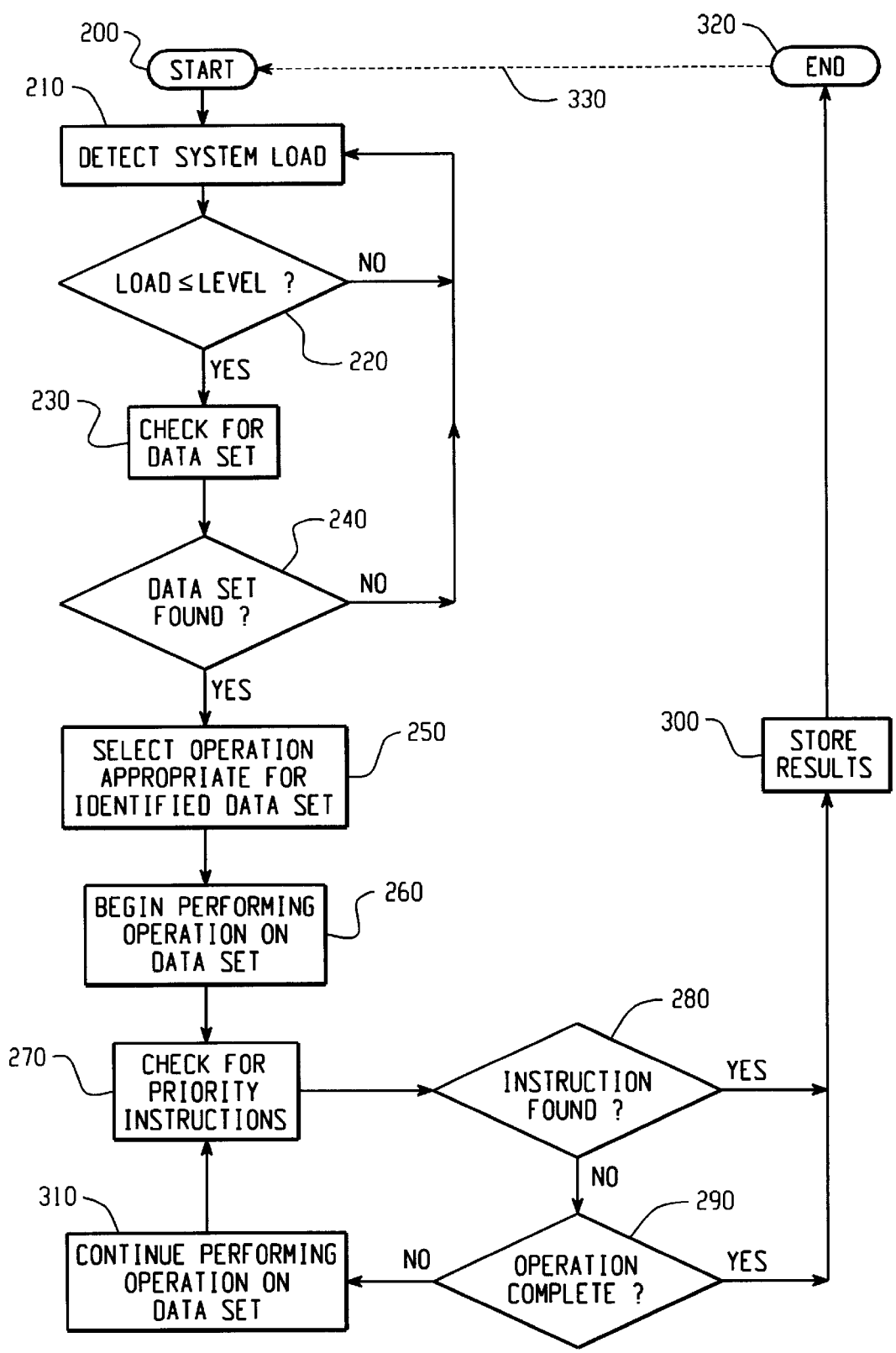
FIG. 3 is a flow chart showing a method of automatic image processing in accordance with aspects of the present invention; and, FIG. 4 is a diagrammatic illustration of multiple imaging station networked together in accordance with aspects of the present invention.

In accordance with a preferred embodiment of the present invention, reconstruction or other image processing is automatically initiated when system resources are available and when there exists a data set to which an operation or operations are applicable. More specifically, with further reference to FIG. 3, at step 200, the image processing or reconstruction starts and the computer 42 is initialized therefor. At step 210, the load on the computer 42 is detected. That is to say, the system resources (e.g., available memory, available processor time, etc.) of the computer 42 are monitored to determine the load on the system. Generally, at any given time, if an imaging experiment is being conducted, or other image processing or reconstruction operations are already being performed, the load on the computer 42 is high or significant. On the other hand, if the computer 42 is idle, the load is small or insignificant.

Next, at decision step 220, it is determined if the load is at or beneath a predetermined or otherwise selected level indicating an availability of resources to perform image processing or reconstruction operations. Accordingly, if the load exceeds the level such that the determination at decision step 220 is no or negative, then the computer's resources are being otherwise utilized and the process loops back to step 210. On the other hand, if the load is at or beneath the level such that the determination at step 220 is yes or affirmative, then the computer's resources are not otherwise engaged and the process proceeds to step 230.

At step 230, a data set is checked for or otherwise identified. The data set is either an originally collected set of raw data or a data set that has already been partially processed or operated on and stored. At decision step 240, it is determined if a data set was found. If no data set is found such that the determination at decision step 240 is no or negative, then there is no image processing or reconstruction to perform and the process loops back to step 210. On the other hand, if a data set is found such that the determination at decision step 240 is yes or affirmative, then there is image processing or reconstruction to be performed and the process continues on to step 250.

At step 250, based upon the characteristic format of the identified data set, an operation is selected which is appropriate for advancing the data processing or reconstruction in the direction of a desired image representation. Thereafter, at step 260, performance of the selected operation on the identified data set begins. At step 270, priority instructions are checked for. Such priority instructions include those instructions for which access to system resources is urgent or important, e.g., instructions from the control terminal 40 that an imaging experiment is about to begin, emergency shut down instructions, etc.

At decision step 280, it is determined if a priority instruction exists. If no instruction is found such that the determination at decision step 280 is no or negative, then the image processing continues and the process moves on to decision step 290. On the other hand, if a priority instruction is found such that the determination at decision step 280 is yes or affirmative, then the image processing or reconstruction is interrupted and the process continues on to step 300 wherein the current results are stored.

At decision step 290, it is determined if the operation is complete. If the operation is not complete such that the determination at decision step 290 is no or negative, then the image processing proceeds to step 310 wherein the operation continues to be performed on the data set until moving on to step 270 when priority instructions are checked for again. On the other hand, if the operation is complete such that the determination at decision step 290 is yes or affirmative, then the image processing or reconstruction is concluded and the process continues on to step 300 wherein the final results for the operation are stored.

Accordingly, the operation continues to be performed on the data set until such time as the operation is completed or a priority instruction interrupts processing. Thereafter, the current results are stored at step 300. After the results are stored at step 300 the process ends at step 320. At the end of the process, feedback relating to the results is preferably sent to the control terminal 40 for access and assessment by the technician. At that point either automatically or upon command, unused, unwanted, or unsatisfactory results which were collected are discarded. Moreover, at that point based on the technicians expert reading of the data, the technician has the option of manually or otherwise applying expressly selected operations to the data sets. Optionally, as indicated by the dashed arrow 330, the process is automatically restarted upon the completion of each cycle.

In this manner then, the automatic image processing or reconstruction involves determining if resources are available for an image processing operation, and determining if in fact a data set exists on which the image processing operation is to be performed. If a data set exists and there are sufficient resources available, it is automatically determined based on the characteristic format of the identified data set or sets which operation or operations are to be applied thereto to further reconstruction or other image processing toward generation of desirable image representations.

With the data sets being differentiated by their characteristic formats, if more than one data set is present and/or more than one operation is applicable, preferably, the data set identified and the operation applied thereto is chosen based on a predetermined hierarchy or an otherwise selected priority scheme. The hierarchy or priority scheme instituted is optionally one that favors identification of data sets nearest to completion of an image representation. As well, the hierarchy or priority scheme optionally favors data sets and/or operations which give rise to the most efficient processing given the currently available system resources on the computer 42.

In one preferred embodiment, the computer 42 maintains an historic analysis of the types of image representations employed by technicians accessing the control terminal 40. Accordingly, the instituted hierarchy favors data sets and/or operations which generate those image representations which are historically most frequently accessed by technicians. Likewise, lower in this hierarchy are data sets and/or operations which produce historically less frequently utilized image representations. Optionally, multiple operations are carried out simultaneously and the percentages of available system resources dedicated to each are made to reflect the types of image representations historically accessed by technicians. That is to say, for example, if historically a particular image type is accessed 70% of the time, then 70% of the available system resources would be dedicated to processing that particular image type.

Figure 4:
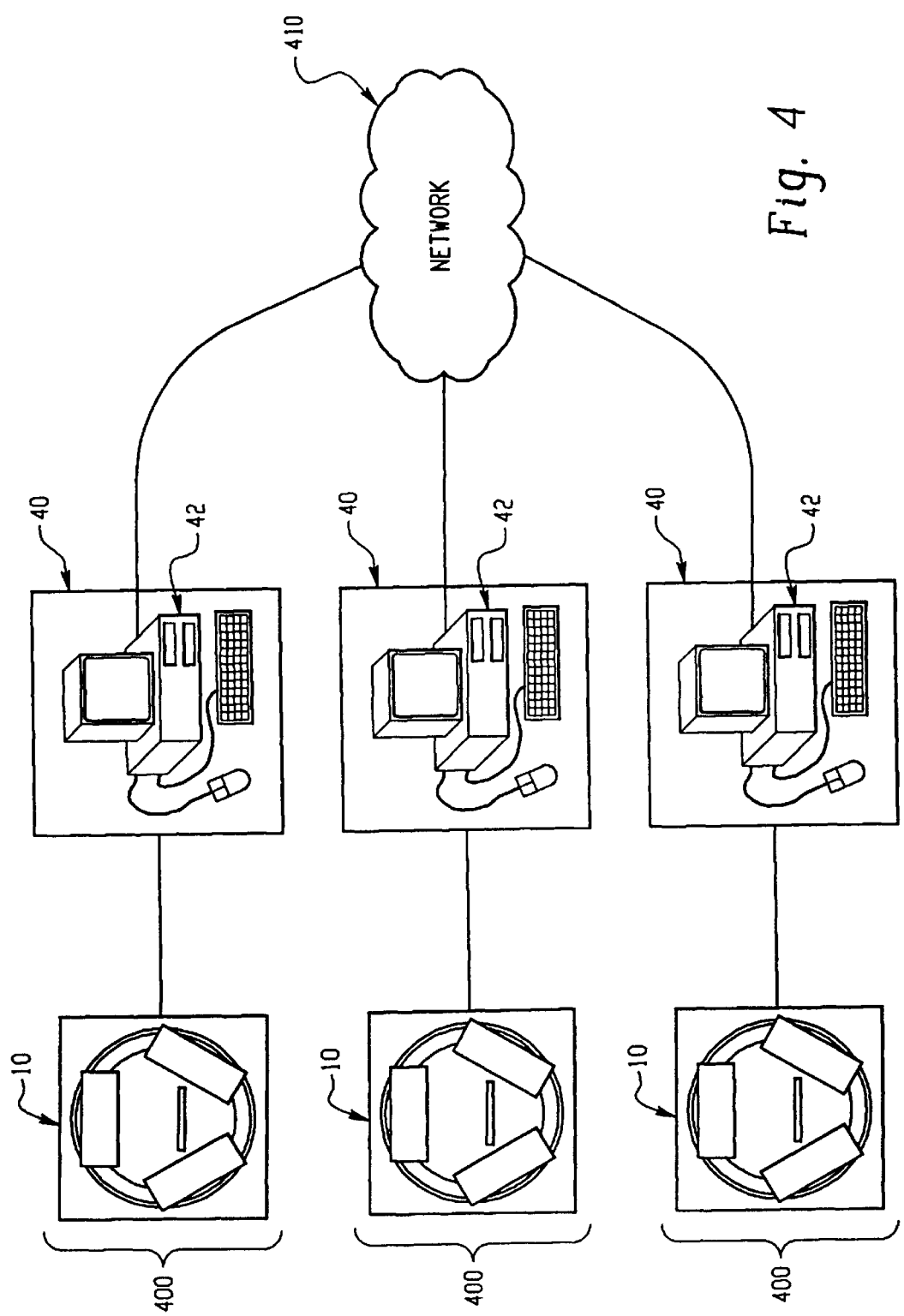

Optionally, as best seen in FIG. 4, multiple imaging stations 400 each include a medical diagnostic imaging apparatus 10 and a control terminal 40. The computers 42 associated with each of the control terminals 40 are linked to one another through a common data network 410. In this manner, the networked computers 42 share the image processing load based on the respective availability of their resources. For example, preferably, in this embodiment, in addition to detecting the load on individual computers 42, the load on the network is also evaluated. Consequently, regardless of the terminal 40 at which the data set was collected or otherwise resides, those computers 42 with available resources are utilized via the network 410 to perform applicable operations on the data set for the desired processing or image reconstruction. In this manner then, when one imaging station 400 is being utilized to run an imaging experiment such that the associated computer 42 is low on available resources, image processing can continue to be simultaneously carried out over the network 410 on computers 42 at otherwise idle imaging stations 400.

The invention has been described with reference to the preferred embodiments. Obviously, modifications and alterations will occur to others upon reading and understanding the preceding detailed description. It is intended that the invention be construed as including all such modifications and alterations insofar as they come within the scope of the appended claims or the equivalents thereof.

Having thus described the preferred embodiments, the invention is now claimed to be:

1. In an imaging system in which data is generated which is reconstructable at the selection of a diagnostician into a plurality of different image representations and in which a common computer system performs both imaging and other functions, an image reconstruction method comprising:

monitoring selected scanning parameters and images previously requested by the diagnostician;

comparing the monitored scanning parameters and previous images with historical scan and image request information to estimate more probable subsequent image requests by the diagnostician;

monitoring for computer system availability; and, while the computer system is available and prior to a subsequent image request, performing at least portions of image reconstruction operations for generating the more probable subsequent images.

2. A method for reconstructing an image representation of a subject from data sets collected using a medical diagnostic imaging apparatus, said method comprising:

(a) defining operations which are performed in reconstructing different types of image representations, said operations being applicable to data sets having particular formats;

(b) identifying data sets having particular formats;

(c) selecting operations from the defined operations based upon the particular format of the identified data sets;

(d) detecting a load on available image processing equipment; and, (e) automatically performing the selected operations on the identified data sets when the detected load is below a desired level to thereby advance reconstruction toward determined types of image representations.

3. The method according to claim 2, said method further comprising:

(f) storing results from performing the selected operations on the identified data sets.

4. The method according to claim 3, said method further comprising:

(g) discarding the stored results that are unwanted.

5. The method according to claim 2, wherein the defined operations are selected from a group consisting of sorting, rebinning, filtering, scaling, interpolating, convolving, backprojecting, transforming, and weighting.

6. The method according to claim 2, said method further comprising:

defining a hierarchy which controls an order in which data sets are identified in step (b) and operations are selected in step (c) when options exist as to which data set to identify and which operation to select.

7. The method according to claim 6, said method further comprising:

receiving requests for desired types of image representations; and, historically tracking how many times each type of image representation is requested, wherein the hierarchy favors identification of data sets in step (b) and selection of operations in step (c) such that priority in the types of image representations reconstructed reflects the historical tracking.

8. The method according to claim 2, wherein the available imaging equipment includes at least one computer.

9. The method according to claim 8, wherein the available imaging equipment includes multiple computers link via a common network.

10. A method for reconstructing an image representation of a subject from data sets collected using a medical diagnostic imaging apparatus, said method comprising:

(a) receiving requests for desired types of image representations;

(b) historically tracking how many times different types of image representations are requested;

(c) defining operations which are performed in reconstructing desired types of image representations, said operations being applicable to data sets having particular formats;

(d) identifying data sets having particular formats;

(e) selecting operations from the defined operations based upon the particular format of the identified data sets;

(f) automatically performing the selected operations on the identified data sets such that a priority for performing the selected operations on the identified data sets is based on the historical tracking.

11. A medical diagnostic imaging system comprising:

at least one imaging station, said imaging station including an imaging scanner which collects raw data from a subject positioned therein; and, a control terminal from which the imaging scanner is operated, said control terminal including a computer having a particular amount of resources for operation of the imaging scanner and image reconstruction, said image reconstruction including processing operations which advance transformation of data sets from raw data to image data, said computer automatically carrying out a processing operation when sufficient resources are available and a data set is detected for which the processing operation is applicable, wherein selection of processing operations is carried out in a determined order based upon historical information which reflects preferences for different types of reconstructed images.

12. The medical diagnostic imaging system according to claim 11, wherein the imaging scanner is a nuclear scanner.

13. The medical diagnostic imaging system according to claim 11, said medical diagnostic imaging system further comprising:

multiple imaging stations; and, a common data network linking the computers from each imaging stations' control terminal such that an image reconstruction load is shared thereby.

14. The medical diagnostic imaging system according to claim 11, wherein the processing operations are selected from a group consisting of sorting, rebinning, filtering, scaling, interpolating, convolving, backprojecting, transforming, and weighting.

15. The medical diagnostic imaging system according to claim 11, wherein the computer stores clinically useful images resulting from the image reconstruction and discards unusable images.

16. A medical diagnostic imaging system comprising:

at least one imaging station, said imaging station including an imaging scanner which collects raw data from a subject positioned therein; and, a control terminal from which the imaging scanner is operated, said control terminal including a computer having a particular amount of resources for operation of the imaging scanner and image processing, said computer automatically carrying out image processing when sufficient resources are available and a data set is detected for which an image processing operation is applicable, wherein the computer selects image processing operations for application to particular data sets based upon characteristic formats of the data sets, said data sets corresponding to pre-reconstructed data.

* * * * *